United States Patent Office 2,894,938
Patented July 14, 1959

2,894,938

COPOLYMER OF A STYRENE COMPOUND AND AN UNSATURATED ALCOHOL

Earl C. Chapin, Springfield, and Richard F. Smith, Ludlow, Mass., assignors to Monsanto Chemical Company, St. Louis, Mo., a corporation of Delaware No Drawing. Application January 12, 1955
Serial No. 481,476

5 Claims. (Cl. 260—88.1)

This invention relates to copolymers of styrenes and allyl or methallyl alcohol. More particularly, the invention relates to a process for the preparation of such copolymers.

Allyl and methallyl alcohol do not homopolymerize readily and are difficult to copolymerize with most unsaturated materials. Copolymers of these alcohols with styrene have been prepared by extensive heating with or without pressure using relatively large amounts of oxygen to catalyze the reaction. This process ordinarily takes from 2 to 10 hours. Copolymers made by this process have many excellent qualities. However, it has been found that the use of so much oxygen causes a partial oxidation to take place in addition to the polymerization so that carbonyl groups of indeterminate character appear in the copolymers.

One object of this invention is to provide copolymers of a styrene and allyl or methallyl alcohol.

Another object is to provide a process for the copolymerization of a styrene with allyl or methallyl alcohol.

A further object is to provide a process for the copolymerization of styrene and allyl or methallyl alcohol in which no oxidation of the copolymer takes place.

These and other objects are attained by copolymerizing a styrene with allyl or methallyl alcohol at from 180 to 300° C. under at least autogenous pressure and in the substantial absence of oxygen.

In the following examples which are illustrative of this invention, parts are by weight.

*Example I*

Mix together 70 parts of styrene monomer and 30 parts of allyl alcohol monomer and 1 part of ditertiarybutyl peroxide. Place the mixture in a pressure-resistant reaction vessel, remove any oxygen in the vessel by purging the space above the mixture with nitrogen and seal the vessel. Then heat the mixture in the sealed vessel at 200° C. for 10 minutes. Cool the vessel and remove the product which is a clear, colorless syrup comprising copolymer dissolved in unreacted monomer. Remove the unreacted monomer by vacuum distillation at 150° C. to obtain a clear, brittle solid soluble in acetone, dimethyl formamide, xylene and xylene-butanol mixtures. A conversion of about 53% is obtained and the copolymer contains about 1.8% hydroxyl groups by weight. This corresponds to an allyl alcohol content of about 6%. The infra-red spectrum shows only benzene and hydroxyl groups on the copolymer chain.

*Example II*

Mix together 30 parts of styrene monomer, 70 parts of allyl alcohol monomer and 3 parts of ditertiarybutyl peroxide. Heat the mixture in a closed oxygen-free vessel at 210° C. for 30 minutes. The product is a clear, colorless syrup containing the copolymer dissolved in unreacted monomer. Remove the monomer by vacuum distillation to obtain a brittle, colorless solid having a hydroxyl content of about 4.3% by weight corresponding to an allyl alcohol content of about 15%. Conversion is about 25%. The copolymer is soluble in acetone, dimethyl formamide, xylene and xylene-butanol mixtures. The infra-red spectrum shows only benzene and hydroxyl groups on the copolymer chain.

*Example III*

Mix together 50 parts of styrene monomer, 50 parts of allyl alcohol and 3 parts of ditertiarybutyl peroxide. Heat the mixed materials in a closed pressure vessel containing no oxygen at 220° C. for 30 minutes. The product is a clear, colorless syrup containing copolymer dissolved in unreacted monomer. Remove the unreacted monomer to obtain a clear, brittle solid having a hydroxyl content of about 2.4% by weight corresponding to an allyl alcohol content of slightly less than 10%. Conversion is about 49%. The copolymer is soluble in acetone, dimethyl formamide, xylene and xylene-butanol mixtures. The infra-red spectrum shows only benzene and hydroxyl groups on the copolymer chain.

*Example IV*

Mix together 50 parts of styrene and 50 parts of allyl alcohol. Pass the mixture through a tubular pressure reactor under substantially oxygen-free conditions at 300° C. Regulate the rate of passage through the reactor so that the mixture is subjected to 300° C. for about 20 minutes. The product is a clear, colorless syrup containing copolymer dissolved in unreacted monomer. Remove the monomer by vacuum distillation to obtain a soft solid having a slight tan tinge and containing about 4.5% hydroxyl groups by weight corresponding to slightly more than 10% allyl alcohol combined in the copolymer. A conversion of about 53% is obtained. The product is soluble in acetone, dimethyl formamide, xylene and xylene-butanol mixtures. The infra-red spectrum shows only benzene and hydroxyl groups on the polymer chain.

The copolymers of this invention comprise copolymers of allyl or methallyl alcohol or mixtures thereof with styrene or ring-substituted styrenes in which the substituents may be alkyl groups or chlorine atoms. Examples of such ring-substituted styrenes are the ortho, para and meta, methyl, ethyl, butyl, etc. monoalkyl styrenes, ortho-para and ortho-meta dimethyl and diethyl styrenes, mono-, di-, or tri-chlorostyrenes, alkyl chlorostyrenes such as ortho methyl para chlorostyrene, etc. A mixture of two or more of these substituted styrene compounds may be used. Mixtures of styrene and the substituted styrenes may also be used. The copolymers should contain from 2 to 30% by weight of combined allyl alcohol or methallyl alcohol.

The copolymers are prepared by mixing together the various monomers required, generally using an excess of the allyl or methallyl alcohol. The mixture is then heated in a closed chamber which is substantially free of oxygen at from 180 to 300° C. for from 10 to 60 minutes. Conversions ranging from 20 to 70% are obtained by this procedure depending on the conditions chosen. Since the heating takes place in a closed chamber above the boiling point of the monomers, considerable pressure is developed autogenously. This pressure is ordinarily sufficiently high for the reaction. However, additional pressure may be applied if desired without materially altering the course of the reaction.

The polymerization reaction may be carried out without using a polymerization initiator, in which case temperatures in the range of from 250 to 300° C. should be used. Lower temperatures down to 180° C. may be used if small amounts, i.e., up to 5% by weight of the monomer mixture of a free radical polymerization initiator, are added to the monomer mixture. Exemplary of such initiators are ditertiarybutyl peroxide, tertiarybutyl perbenzoate, benzoyl peroxide, pinacolone peroxide, etc.

Under some conditions, it may be desirable to add a relatively inert solvent to the monomer mixture. Solvents such as xylene, benzene, etc. may be used. The solvents do not alter the course of the reaction but do provide a less viscous and, therefore, more easily handled end product of the reaction.

The end product of the polymerization reaction is a solution of the copolymer in unreacted monomer and solvent, if a solvent is used. The copolymer is recovered by removing the unreacted monomer and solvent by vacuum distillation at temperatures ranging from 100 to 250° C.

The copolymers range from soft, almost liquid materials, to hard, brittle solids. In most cases, the copolymers are clear and colorless. They may be used per se as modifiers for thermosetting resins in coating compositions or they may be reacted with various drying oil acids to provide air drying coating resins.

The foregoing description and particularly the examples are illustrative of this invention and it is obvious that many variations may be made within the spirit and scope thereof.

What is claimed is:

1. A process for preparing a copolymer of an unsaturated alcohol and a styrene compound in which copolymer the unsaturated alcohol is combined to the extent of from 2 to 30% by weight, which comprises mixing 30–70% by weight of the styrene compound with, correspondingly, 70–30% by weight of the unsaturated alcohol, and a free radical peroxide catalyst in an amount up to 5% by weight of the monomer mixture, purging the reaction vessel of substantially all the oxygen therein to produce substantially oxygen-free conditions and heating the resulting mixture in such oxygen-free conditions at from 180 to 300° C. under at least autogenous pressure for from 10 to 60 minutes, said unsaturated alcohol being a member of the group consisting of allyl alcohol, methallyl alcohol and mixtures thereof, and said styrene compound being a member of the group consisting of styrene, ring-substituted alkyl styrenes, ring-substituted chlorostyrenes, ring-substituted alkyl chlorostyrenes and mixtures thereof.

2. A process as in claim 1 wherein the alcohol is allyl alcohol.

3. A process as in claim 1 wherein the styrene compound is styrene.

4. A process as in claim 1 wherein the alcohol is allyl alcohol and the styrene compound is styrene.

5. A process as in claim 1 wherein the process is carried out in the presence of an inert solvent.

References Cited in the file of this patent

UNITED STATES PATENTS

| | | |
|---|---|---|
| 2,426,476 | Vaughan et al. | Aug. 26, 1947 |
| 2,630,430 | Shokal et al. | Mar. 3, 1953 |
| 2,659,717 | Park | Nov. 17, 1953 |
| 2,667,467 | Morner | Jan. 26, 1954 |
| 2,713,042 | Park | July 12, 1955 |
| 2,718,515 | Thomas | Sept. 20, 1955 |

OTHER REFERENCES

D'Alelio: Fundamental Principles of Polymerization, pp. 311–318, John Wiley (1952). (Copy in Scientific Library.)